(12) United States Patent
Chacko et al.

(10) Patent No.: US 11,361,908 B2
(45) Date of Patent: Jun. 14, 2022

(54) CAPACITOR WITH VOLUMETRICALLY EFFICIENT HERMETIC PACKAGING

(71) Applicant: KEMET Electronics Corporation, Fort Lauderdale, FL (US)

(72) Inventors: Antony Chacko, Simpsonville, SC (US); Randolph S. Hahn, Simpsonville, SC (US); David Jacobs, Simpsonville, SC (US); Brandon Summey, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 121 days.

(21) Appl. No.: 17/089,875

(22) Filed: Nov. 5, 2020

(65) Prior Publication Data

US 2021/0057167 A1    Feb. 25, 2021

Related U.S. Application Data

(62) Division of application No. 15/090,165, filed on Apr. 4, 2016, now Pat. No. 10,861,652.

(60) Provisional application No. 62/157,668, filed on May 6, 2015.

(51) Int. Cl.
| | |
|---|---|
| *H01G 9/10* | (2006.01) |
| *H01G 9/00* | (2006.01) |
| *H01G 9/15* | (2006.01) |
| *H01G 9/04* | (2006.01) |
| *H01G 9/042* | (2006.01) |

(52) U.S. Cl.
CPC ............. *H01G 9/10* (2013.01); *H01G 9/0029* (2013.01); *H01G 9/04* (2013.01); *H01G 9/0425* (2013.01); *H01G 9/15* (2013.01)

(58) Field of Classification Search
None
See application file for complete search history.

(56) References Cited

U.S. PATENT DOCUMENTS

| | | | | | |
|---|---|---|---|---|---|
| 3,439,231 | A | * | 4/1969 | Booe | H01G 2/12 361/536 |
| 5,140,502 | A | * | 8/1992 | Kudoh | H01G 9/08 29/25.03 |
| 5,371,650 | A | * | 12/1994 | Lavene | H01G 4/224 29/25.42 |
| 8,310,815 | B2 | * | 11/2012 | Freeman | H01G 9/10 361/525 |
| 2006/0017089 | A1 | * | 1/2006 | Taller | H01G 9/10 257/306 |
| 2009/0015988 | A1 | * | 1/2009 | Kuriyama | H01G 9/14 361/523 |
| 2010/0265634 | A1 | * | 10/2010 | Freeman | H01G 9/012 29/25.03 |
| 2011/0157776 | A1 | * | 6/2011 | Ishida | H01G 9/0029 29/25.03 |

(Continued)

*Primary Examiner* — Dion R. Ferguson
(74) *Attorney, Agent, or Firm* — Joseph T. Guy; Patent Filing Specialist Inc.

(57) ABSTRACT

An improved method of forming a capacitor, and capacitor formed thereby, is described. The method comprises forming an anode with an anode lead extending therefrom, forming a dielectric on the anode, forming a solid cathode layer on the dielectric and forming a hermetic encasement on the capacitor wherein the hermetic encasement comprises a conformal non-conductive layer.

20 Claims, 6 Drawing Sheets

(56) References Cited

U.S. PATENT DOCUMENTS

2016/0141718 A1* 5/2016 Ye .................. H01M 50/417
                                                                 429/188
2016/0329156 A1* 11/2016 Chacko .............. H01G 9/04

* cited by examiner

CAPACITOR WITH VOLUMETRICALLY EFFICIENT HERMETIC PACKAGING

CROSS-REFERENCE TO RELATED APPLICATIONS

The present application is a divisional of pending U.S. patent application Ser. No. 15/090,165 filed Apr. 4, 2016, which in turn claims priority to pending expired U.S. Provisional Patent Application No. 62/157,668 filed May 6, 2015 which his both of which are incorporated herein by reference.

BACKGROUND

The present invention is related to an improved method of packaging a solid electrolyte capacitor and an improved capacitor formed thereby. More specifically, the present invention is related to improving the volumetric efficiency of a hermetically sealed capacitor by conformal hermetic elements.

Significant efforts are focused on increasing the volumetric efficiency of solid electrolytic capacitors. The volumetric efficiency of an electrolytic capacitor is typically defined as the ratio of the active capacitor volume to the volume of the entire encapsulated capacitor package. The anode lead wire typically extends axially from the anode to a lead frame and ultimately to an external termination. The wire, and connections thereto, occupy a significant non-contributory volume inside the capacitor package which is difficult to eliminate without creating other issues such as close approach of anodic and cathodic components of the capacitor.

U.S. Pat. No. 8,576,544, which is incorporated by reference, describes a method for increasing volumetric efficiency. The method involves the use of a ceramic housing. The ceramic housing itself leads to significant decrease in volumetric efficiency as the ceramic housing provides no capacitance yet does occupy a significant volume. Other prior art methods of hermetically sealing solid electrolytic capacitors involve placing capacitive elements inside one part of a preformed hermetic package such as a can, housing, sleeve, or flat substrate, and hermetically closing the package by attaching a preformed lid, seal, top, or housing. These methods have inherently low volumetric efficiency.

U.S. Pat. No. 3,343,047, which is incorporate herein by reference, is somewhat beneficial yet the entirety of the capacitor body is conductive which leads to mounting issues. Encasing the capacitor in polymeric resin is typically done yet this decreases volumetric efficiency as the polymeric resin occupies additional space without contribution to capacitance.

In spite of the ongoing efforts there is still a need for improvements in hermetically sealed capacitors.

SUMMARY OF THE INVENTION

It is an object of the invention to provide a solid hermetically encased electrolytic capacitor with high volumetric efficiency.

A particular feature of the instant invention is the ability to manufacture the solid hermetically encased electrolytic capacitor without significant alterations to the manufacturing process.

These, and other advantages, as will be realized, are provided in a method of forming a capacitor. The method comprises forming an anode with an anode lead extending therefrom, forming a dielectric on the anode, forming a solid cathode layer on the dielectric and forming a hermetic encasement on the capacitor wherein the hermetic encasement comprises a conformal non-conductive layer.

Yet another embodiment is provided in a method of forming a hermetically encased capacitor. The method comprises forming an anode with an anode wire extending therefrom, forming a dielectric on the anode, inserting the anode wire through a cap, hermetically sealing the anode wire to the cap, forming a solid cathode layer on at least a portion of the dielectric and forming a conformal metal coating wherein the conformal metal coating is hermetically sealed to the cap.

Yet another embodiment is provided in a capacitor comprising an anode with an anode lead extending therefrom. A dielectric is on the anode and a solid cathode layer is on the dielectric. A hermetic encasement is on the capacitor wherein the hermetic encasement comprises a conformal non-conductive layer.

Yet another embodiment is provided in a hermetically encased capacitor. The capacitor comprises an anode with an anode wire extending therefrom wherein the anode wire extends through a cap and the anode wire is hermetically sealed to the cap. A dielectric is on the anode. A solid cathode layer is on at least a portion of the dielectric. A conformal metal coating is hermetically sealed to said cap.

DETAILED DESCRIPTION

Figure 1:
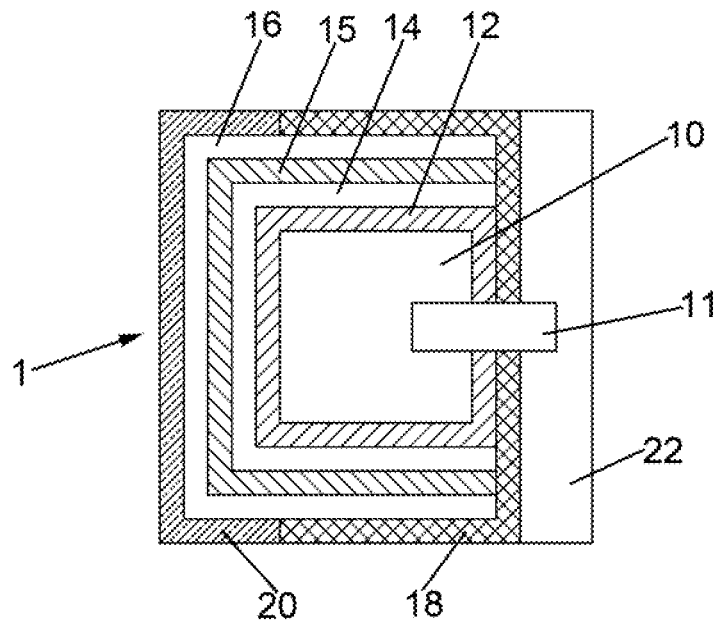
FIG. 1 is a cross-sectional schematic side view of an embodiment of the invention.

The present application is related to a hermetically encased capacitor, and method of making the hermetically encased capacitor, wherein the volumetric efficiency is improved through the use of conformal hermetic coatings with electrical isolation of the anode and cathode.

For the purposes of the instant invention conformal, conformally, or derivatives thereof refers to a layer which generally follows the contour of the underlying layer. Examples of conformal coatings include coatings, which are allowed to flow to a certain extent, and deposited layers which deposit in a conforming manner to the layer deposited on.

For the purposes of the present invention the terms encase, encased or derivatives thereof refers to layer which encloses or covers in a close fitting surround.

The construction and manufacture of solid electrolyte capacitors is well documented. In the construction of a solid electrolytic capacitor a conductor, and preferably a valve metal, serves as the anode. The valve metal is preferably selected from the group consisting of Al, W, Ta, Nb, Ti, Zr and Hf or a conductive oxide thereof such as NbO. The anode body can be a porous pellet, formed by pressing and sintering a high purity powder, or a foil which is etched to provide an increased anode surface area. An oxide of the valve metal is electrolytically formed to cover up to all of the surfaces of the anode and to serve as the preferred dielectric of the capacitor. A solid electrolyte at least partially encases the dielectric wherein the solid electrolyte and anode separated by a dielectric form the capacitive couple.

The solid cathode electrolyte is typically chosen from a very limited class of materials, to include manganese dioxide or electrically conductive organic materials, intrinsically conductive polymers, such as polyaniline, polypyrol, polythiophene and their derivatives. Commercially available polyethylene dioxythiophene, and mixtures thereof, commercially available from Hareaus, are particularly preferred conductive polymers. The solid cathode electrolyte is applied so that it conformally covers all dielectric surfaces and is in direct intimate contact with the dielectric with the understanding that the solid cathode electrolyte is not in direct electrical contact with the anode. In addition to the solid electrolyte, the cathodic layer of a solid electrolyte capacitor typically comprises several layers external to the anode body to allow for subsequent connection to terminations or circuit traces. In the case of surface mount constructions these layers typically include: a carbon layer; a cathode conductive layer which may be a layer containing a highly conductive metal, typically silver, bound in a polymer or resin matrix; or an electroplated metal coating, and a conductive adhesive layer such as silver filled adhesive. The carbon containing layer also functions to block metal from migrating into the solid electrolyte. The layers including the solid cathode electrolyte, conductive adhesive and layers there between are referred to collectively herein as the cathode layer which typically includes multiple interlayers designed to allow adhesion on one face to the dielectric and on the other face to the cathode lead. A highly conductive metal lead frame is often used as a cathode lead for negative termination. The various layers connect the solid electrolyte to the outside circuit and also serve to protect the dielectric from thermo-mechanical damage that may occur during subsequent processing, board mounting, or customer use.

The method of forming metal containing cathode conductive layers includes electroplating, electroless plating, sputter deposition, atomic layer deposition, etc. A method of electroplating solid electrolytic capacitor cathodes is described in U.S. Pat. No. 8,310,816, which is incorporated herein by reference. Electroplating can be done by reverse bias.

The invention will be described with reference to the various figures forming an integral, non-limiting, component of the disclosure. Throughout the various figures similar elements will be numbered accordingly.

An embodiment of the invention will be described with reference to FIG. 1 wherein an embodiment of the invention is illustrated in cross-sectional schematic side view. The capacitor, generally represented at 1, comprises an anode, 10, with an anode wire, 11, extending therefrom or attached thereto. A dielectric, 12, encases at least a portion of the anode and may encompass the entire anode and a portion of the anode wire. A conformal conductive layer, 14, preferably comprising at least one conductor selected from a conductive polymer and manganese dioxide, encases at least a portion of the dielectric with the understanding that the conformal conductive layer is not in electrical contact with the anode or anode wire. It is understood to those in the art that electrical connection of a metal lead or circuit trace to a conductive layer, particularly a conductive layer comprising conductive polymer or manganese dioxide, is difficult and it has therefore become common in the art to apply a conformal transition layer, 15, encasing the conformal conductive layer wherein the transition layer comprises conductive carbon. A conformal metal layer, 16, which functions as the metalized cathode coating, encases at least a portion of the conformal transition layer and functions as an integral component of the hermetic encasement. A conformal non-conductive layer, 18, forms a conformal layer over at least that portion of the anode, and dielectric if present, not encased by the conformal metal layer and forms a hermetic seal with the conformal metal layer and with the anode wire with the anode wire extending through the conformal non-conducting layer. It is preferable that the conformal non-conductive layer encases at least a portion of the conformal metal layer. The conformal metal layer and conformal non-conductive layer are taken together to form a conformal hermetic encasement with a portion of the conformal hermetic seal being conductive and a portion of the conformal hermetic encasement being a non-conductive wherein the hermetical encasement comprises a minimum number of junctions with one being a junction between the conformal metal layer and conformal non-conductive layer and a second junction being between the conformal non-conductive layer and anode wire. A cathode plating, 20, is preferably applied to a portion of the conformal metal layer not encased with conformal non-conductive layer to form a cathode termination. The cathode plating is preferably a solderable layer suitable for attachment of the capacitor to a circuit trace or cathode lead. A conductive end cap, 22, in electrical contact with the anode wire provides an anode termination. Portions of the capacitor illustrated in FIG. 1 may be further encased in a non-conductive resin if desired.

Figure 2:
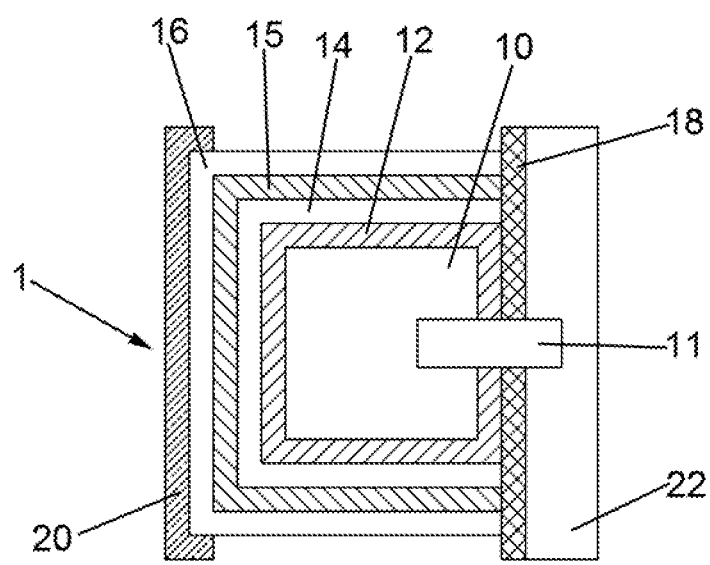
FIG. 2 is a cross-sectional schematic side view of an embodiment of the invention.

An embodiment of the invention is illustrated in cross-sectional schematic view in FIG. 2 wherein the anode, 10, anode wire, 11, dielectric, 12, conformal conductive layer, 14 and conformal transition layer, 15, are as described relative to FIG. 1. In FIG. 2 the conformal non-conductive layer, 18, forms a cap with a hermetic seal between the edge of the conformal metal layer, 16, and the conformal non-conductive layer, 18. The cathode plating, 20, and conductive end cap, 22, are as described relative to FIG. 1. Portions of the capacitor illustrated in FIG. 2 may be further encased in a non-conductive resin if desired. In the embodiment illustrated in FIG. 2, the conformal non-conductive layer is preferably a ceramic blocking element co-sintered with the anode during anode sintering.

Figure 3:
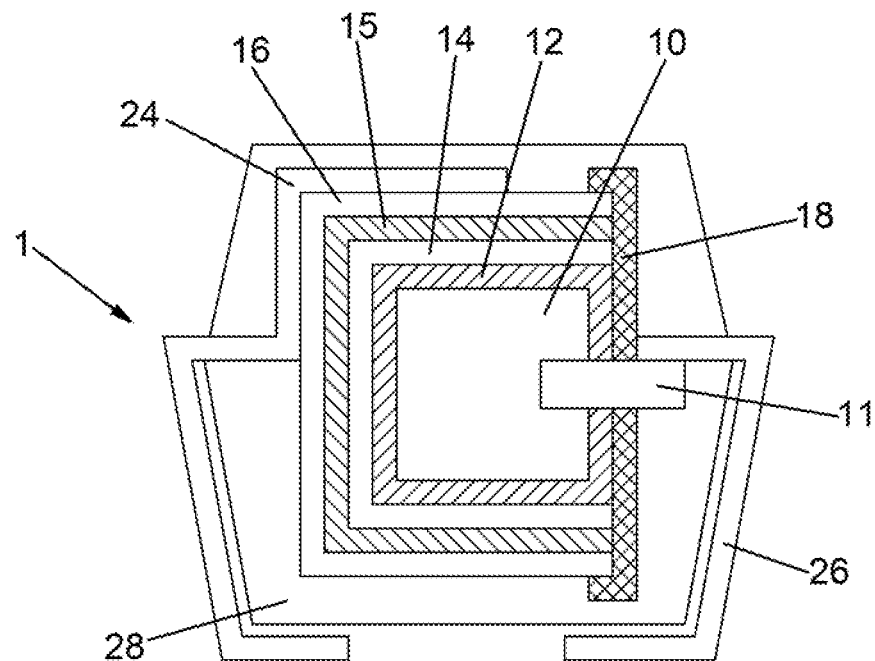
FIG. 3 is a cross-sectional schematic side view of an embodiment of the invention.

An embodiment of the invention is illustrated is cross-sectional schematic view in FIG. 3. In FIG. 3, a cathode lead, 24, is in electrical contact with the conformal metal layer, 16. An anode lead, 26, is in electrical contact with the anode wire, 11. The entire assembly, except for a portion of the cathode lead and a portion of the anode lead, are encased in a non-conductive resin, 28. In FIG. 3, the hermetic encasement is represented by the conformal metal layer and conformal non-conductive layer hermetically sealed to each other.

Figure 4:
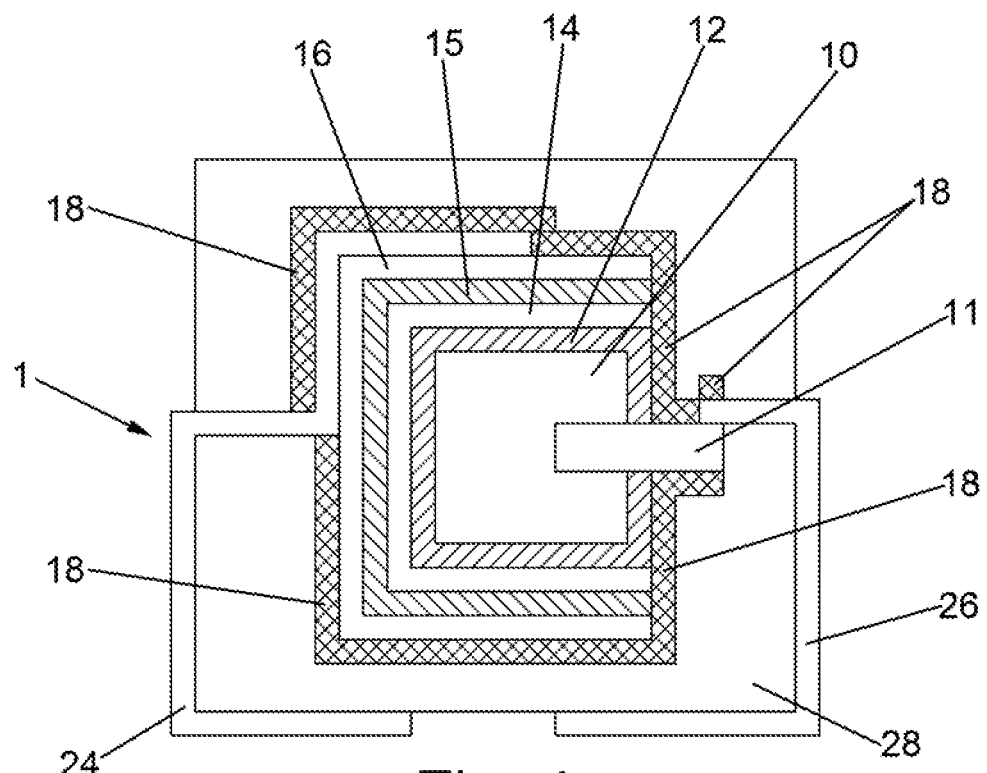
FIG. 4 is a cross-sectional schematic side view of an embodiment of the invention.

An embodiment of the invention is illustrated in cross-sectional schematic view in FIG. 4. In FIG. 4, a cathode lead, 24, is in electrical contact with the conformal metal layer, 16, and an anode lead, 26, is in electrical contact with the anode wire, 11. A conformal non-conductive layer, 18, encases the entirety of the cathode body comprising the anode, 10, dielectric, 12, conformal conductive layer, 14, conformal transition layer, 15, and conformal metal layer, 16. The conformal non-conductive layer also encases at least a portion of the anode wire, 11, as well as a portion of the cathode lead and a portion of the anode lead. A non-conductive resin, 28, preferable at least partially encases the conformal non-conductive layer wherein the cathode lead and anode lead extend through the non-conductive resin. In one embodiment the cathode lead and anode lead are bent to a co-planar relationship on a common face of the capacitor body to provide a surface mount capacitor.

Figure 5:
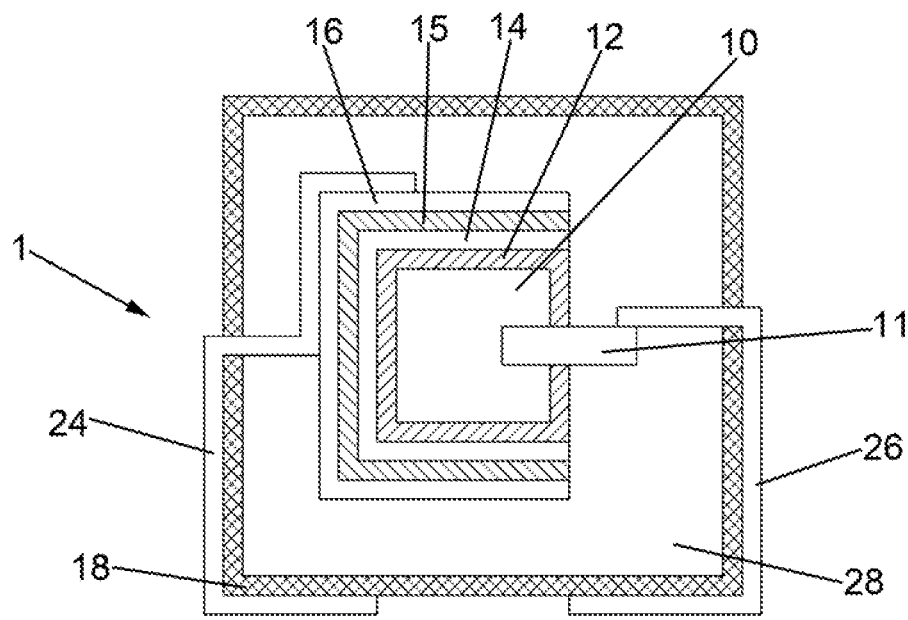
FIG. 5 is a cross-sectional schematic side view of an embodiment of the invention.

An embodiment of the invention is illustrated in cross-sectional schematic view in FIG. 5. In FIG. 5, a capacitor body comprising the anode, 10, dielectric, 12, conformal conductive layer, 14, conformal transition layer, 15 and conformal metal layer, 16, are discussed above. A cathode lead, 24, is in electrical contact with the conformal metal layer, 16, and an anode lead is in electrical contact with the anode wire, 11. A non-conductive resin, 28, encases the entire cathode body, the anode wire, and a portion of both the cathode lead and anode lead with the cathode lead and anode lead extending through the non-conductive resin. A conformal non-conductive layer, 18, encases the entire non-conductive resin with a portion of the cathode lead and anode lead extending through the conformal non-conductive layer and hermetically sealed to the conformal non-conductive layer thereby providing a hermetic encasement.

Figure 6:
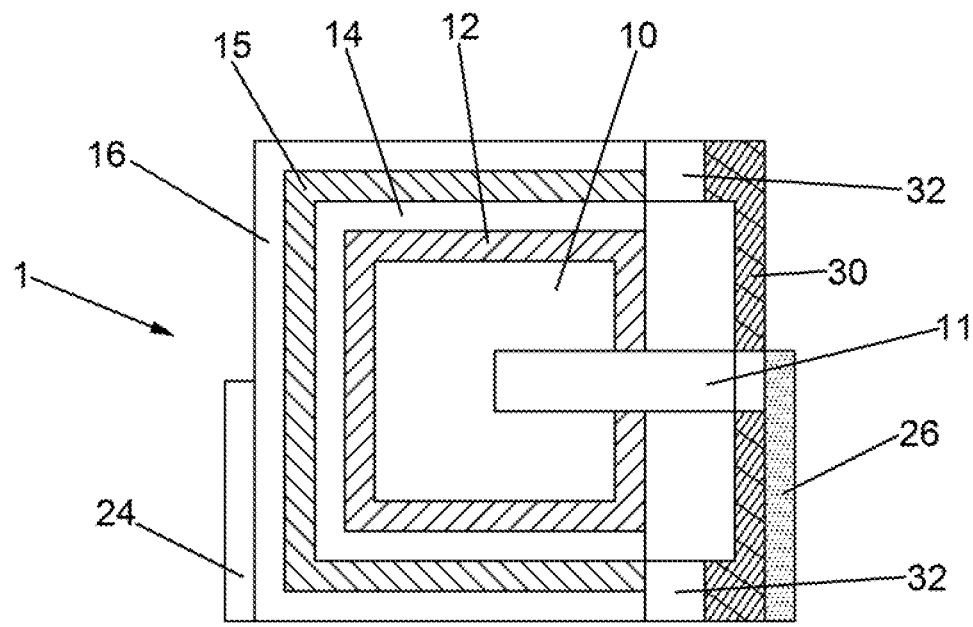
FIG. 6 is a cross-sectional schematic side view of an embodiment of the invention.

An embodiment of the invention is illustrated in cross-sectional schematic view in FIG. 6 wherein the anode wire, 11, and anode body comprising the anode, 10, dielectric, 12, conformal conductive layer, 14, conformal transition layer, 15 and conformal metal layer, 16, are as discussed previously. A cathode lead, 24, is in electrical contact with the conformal metal layer. A ceramic end cap, 30, is attached to the anode body by a, preferably non-conductive, hermetic seal, 32, between the ceramic end cap and conformal metal layer. The anode wire, 11, is electrically connected to the anode lead, 26. The hermetic seal is formed by the combination of the conformal metal coating, the ceramic end cap, the hermetic seal there between and the hermetic seal between the ceramic end cap and anode wire thereby forming a hermetic encasement.

Figure 7:
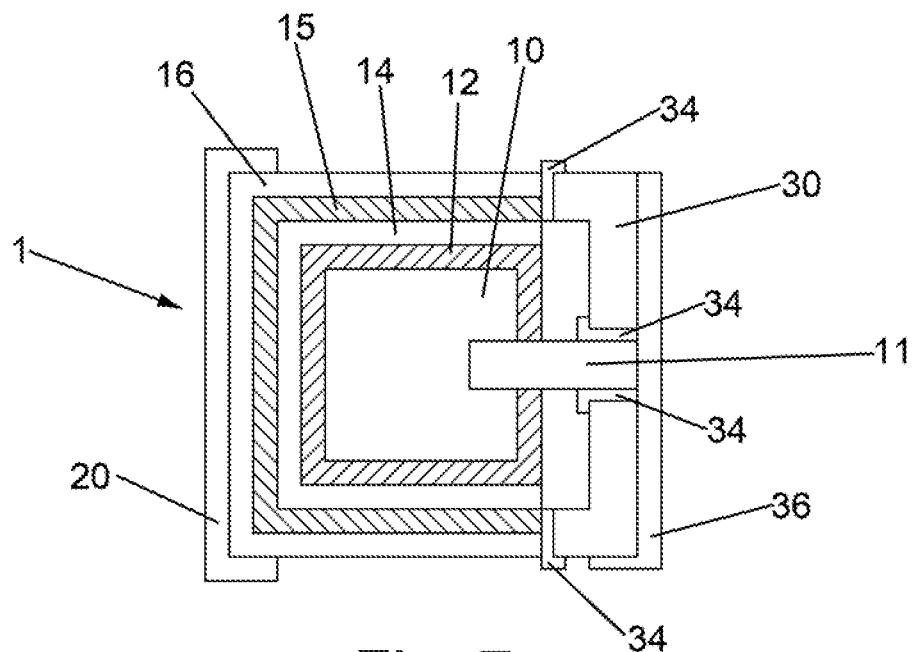
FIG. 7 is a cross-sectional schematic side view of an embodiment of the invention.

An embodiment of the invention is illustrated in cross-sectional schematic view in FIG. 7 wherein the anode wire, 11, and anode body comprising the anode, 10, dielectric, 12, conformal conductive layer, 14, conformal transition layer, 15 and conformal metal layer, 16, are as discussed previously. A cathode plating, 20, is applied to a portion of the conformal metal layer, 16, as a cathode termination. A ceramic end cap, 30, comprising metallized areas, 34, is welded to the conformal metal layer and anode wire, 11, at the metallized areas. An anode plating, 36, is in electrical contact with the anode wire thereby forming the anode termination. The hermetic encasement is provided by the conformal metal coating, ceramic end cap, metallurgical bond between the metallized area of the ceramic end cap and either a metallurgical bond between a metallized area of the end cap and anode wire or a metallurgical bond between a metallized area of the end cap and the anode plating.

Figure 8:
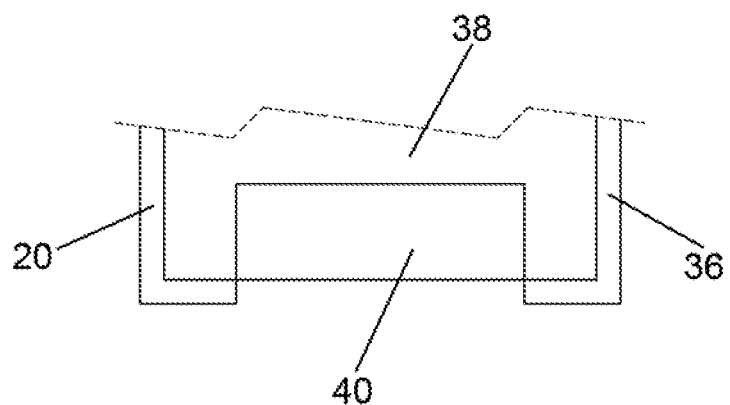
FIG. 8 is a side partial schematic view of an embodiment of the invention.

An embodiment of the invention is illustrated in cross-sectional schematic view in FIG. 8 wherein the anode body, 38, comprising a cathode plating, 20, and anode plating, 36, are as described relative to FIG. 7. In FIG. 8, an insulator, 40, is provided on the mounting surface to eliminate any electrical short which can occur from solder being in electrical contact, or close proximity, to both the anode and cathode leads.

Figure 9:
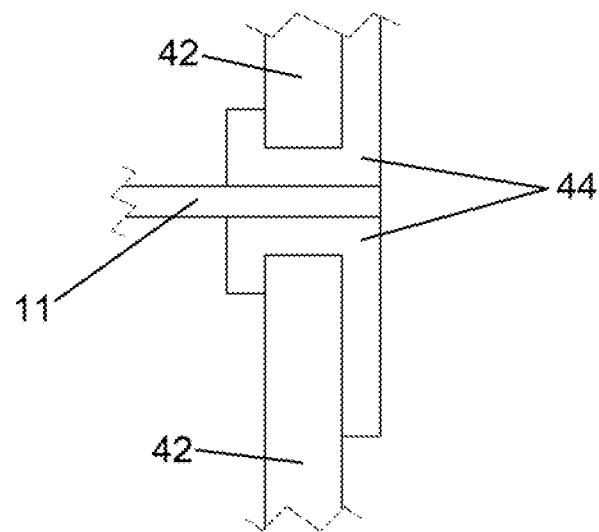
FIG. 9 is a side partial schematic view of an embodiment of the invention.

An embodiment of the invention is illustrated in cross-sectional schematic partial view in FIG. 9. In FIG. 9, an end cap, 42, preferably a ceramic end cap, comprises a plated via, 44, through which the anode wire, 11, extends for electrical connection therewith. The electrical connection is preferably a weld as a weld is a hermetic seal.

Figure 10:
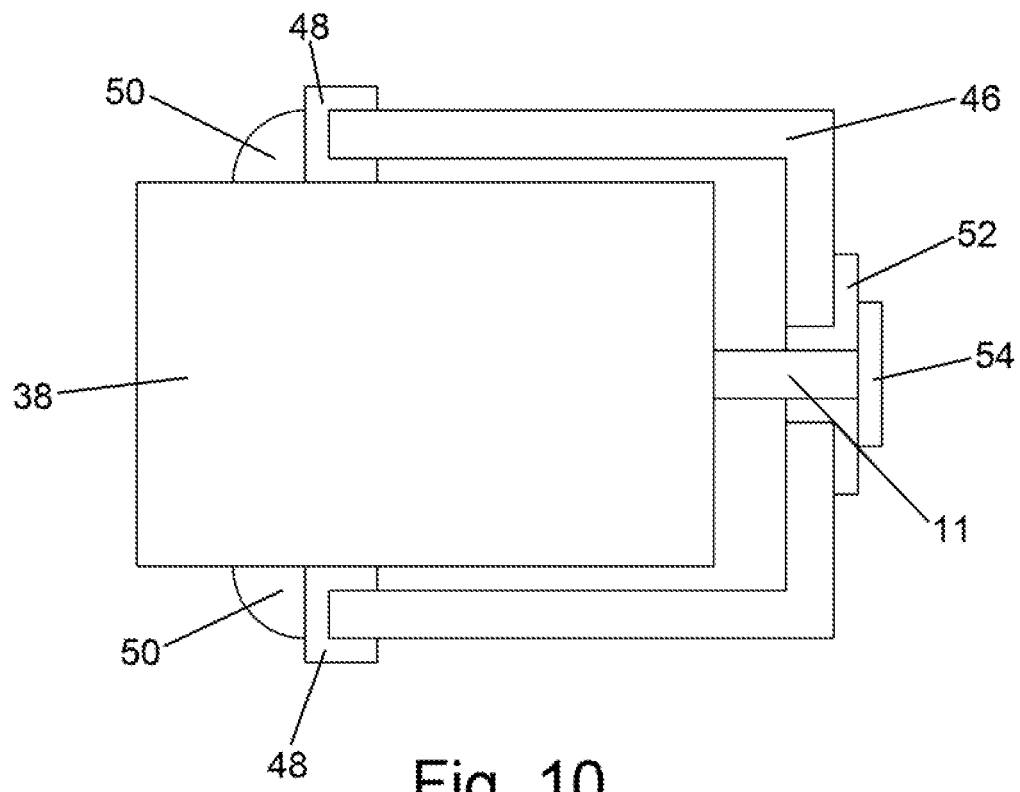
FIG. 10 is a side partial cross-sectional side view of an embodiment of the invention.

An embodiment of the invention is illustrated in schematic partial cross-sectional side view in FIG. 10. In FIG. 10, the capacitor body, 38, is as described above. A sleeve cap, 46, at least partially receives the capacitor body therein and at least partially encases the capacitor body. The sleeve cap comprises body metallization areas, 48, which are attached to the conformal metal layer of the capacitor body such as by a weld or solder joint, 50. A wire metallization area, 52, which may be a plated via, is attached to the anode wire, 11, by a joint, 54, such as a weld or solder joint.

Figure 11:
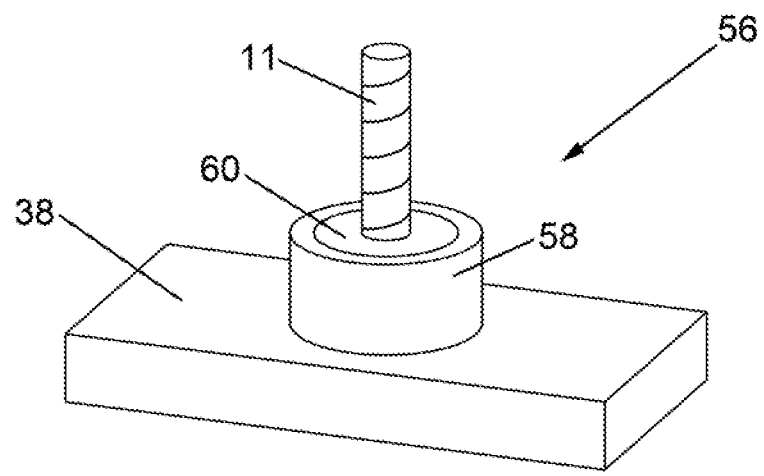
FIG. 11 is a top partial top view of an embodiment of the invention.

An embodiment of the invention is illustrated in schematic partial top view in FIG. 11. In FIG. 11, the capacitor body, 38, and anode wire, 11, are as discussed above. An annular seal, 56, comprising a metal shell, 58, and core, 60, encases the anode wire. The core is preferably a glass and a hermetic seal is formed between the core of the annular seal and anode wire by annealing, or heating, the core to form a conformal non-conductive layer on the anode wire. A conformal conductive layer is then formed over the body and is in a sealing relationship with the shell of the annular seal. The ring can be slipped over the anode wire and heat treated to fuse the glass to the anode wire. The part can then be metal plated, such as with copper, thereby joining the copper ring to the plating. This will form a hermetic encasement including a hermetic seal to wire with the glass, the glass to the copper ring and the copper ring to the copper over plating.

Figure 12:
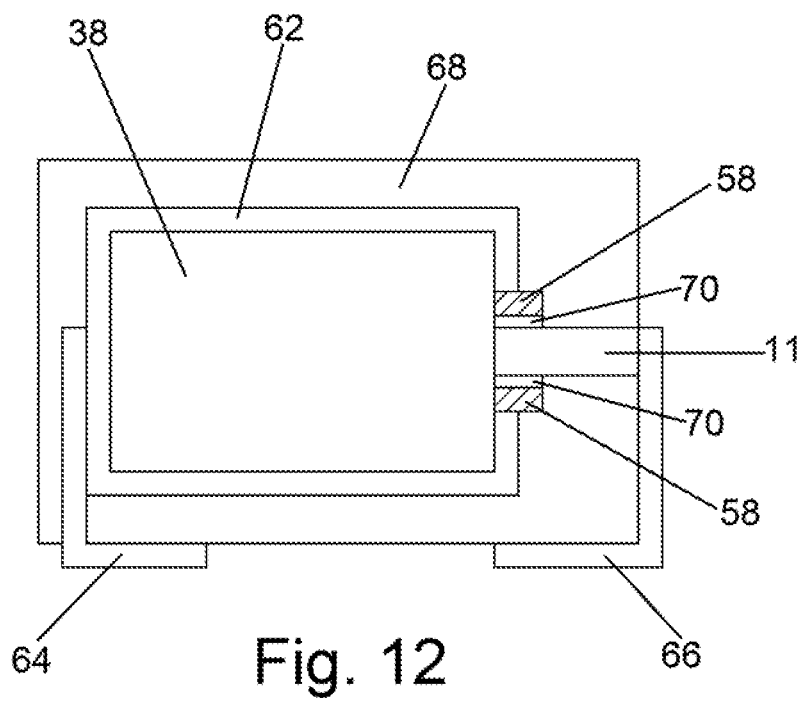
FIG. 12 is a side partial cross-sectional side view of an embodiment of the invention.

An embodiment of the invention is illustrated in partial cross-sectional side view in FIG. 12. In FIG. 12, the anode body, 38, has an anode wire, 11, extending therefrom. An annular seal, 56, forms a non-conducting hermetic seal, 68, with the anode wire and the conducting shell, 70, on the non-conducting core. A conforming conducting layer, 62, is formed on the capacitor body and forms a hermetic seal with the shell, 58. A cathode lead, 64, is electrically connected to the conforming conducting layer. An anode lead, 66, is electrically connected to the anode wire. An optional but preferred insulator, 68, preferably encases at least a portion of the capacitor body and a portion of the cathode lead and anode lead.

It is understood by those skilled in the art that the anode wire may be a solid wire inserted into the anode during the process of forming the anode by pressing and sintering a powder. Alternatively the anode wire may be a wire welded or otherwise connected to the exterior of the anode. Another possibility familiar to those skilled in the art is an anode lead that is an extension of the anode itself.

In one embodiment the anode is a foil, preferably an aluminum foil where that portion of the aluminum foil covered with the conformal conductive layer, which functions as the cathode, can be considered the anode and the portion of the aluminum foil not covered with the cathode can be considered the anode wire also referred to as an anode lead. On the exterior of the anode is a dielectric.

In one embodiment the conformal transition layer comprises a carbon containing layer which allows for adhesion of the subsequent metal layer to the conformal conductive layer and blocks migration of metal to the cathode.

The conformal metal coating is applied over the conformal transition layer wherein the conformal metal coating is a component of the hermetic encasement. In one embodiment the conformal metal coating comprises at least 50% of the surface area of the hermetic encasement.

The conformal layers may be applied directly by methods including dipping and thin film deposition methods such as electroplating, electroless plating, sputtering, and atomic layer deposition. In some embodiments the conformal hermetic coating may be conductive and form an integral part of the cathode. In other embodiments the conformal hermetic coating is nonconductive. Alternatively, the conformal hermetic coating can be applied to a material encapsulating the capacitive element leaving a portion of the anode and cathode exposed to serve as terminations. The conformal hermetic coating can be applied by methods such as flame spray or atomic layer deposition of a nonconductive ceramic. The material may be a low temperature glass.

Portions of the hermetic seal can be applied by methods including flame spraying of a nonconductive hermetic material such as ceramic; application of a low firing temperature glass or atomic layer deposition of a ceramic. The nonconductive hermetic isolation element may be applied before or after formation of the dielectric, the cathode or additional conductive coatings. One method of forming a conformal non-conductive hermetic element is by thermal spray, flame spraying or plasma spraying. Thermal spraying techniques are coating processes in which melted, or heated, materials are sprayed onto a surface. The "feedstock", or coating precursor, is heated preferably by electrical energy, such as by plasma or arc, or by chemical means, such as by a combustion flame. Thermal spraying can provide thick coatings, such as an approximate thickness range of 20 micrometers to several mm depending on the process and feedstock, over a large area at a high deposition rate as compared to other coating processes such as electroplating, physical vapor deposition or chemical vapor deposition. Coating materials available for thermal spraying include metals, alloys, ceramics, plastics and composites. The coating materials are fed in powder form or wire form, heated to a molten or semi-molten state and accelerated towards the substrate in the form of micrometer-size particles. Combustion or electrical arc discharge is usually used as the source of energy for thermal spraying. Resulting coatings are made by the accumulation of numerous sprayed particles. The surface may not heat up significantly, allowing the coating of flammable substances.

Another method of forming a non-conductive hermetic element is by Atomic Layer Deposition (ALD). ALD is a thin film deposition method in which a film is grown on a substrate by exposing its surface to alternate gaseous species, typically referred to as precursors. In contrast to chemical vapor deposition, the precursors are never present simultaneously in the reactor, but they are inserted as a series of sequential, non-overlapping pulses. In each of these pulses the precursor molecules react with the surface in a self-limiting way so that the reaction terminates once all the reactive sites on the surface are consumed. Consequently, the maximum amount of material deposited on the surface after a single exposure to all of the precursors, a so-called ALD cycle, is determined by the nature of the precursor-surface interaction. By varying the number of cycles it is possible to grow materials uniformly and with high precision on arbitrarily complex and large substrates.

Another method of forming a conformal non-conductive hermetic element is by low melting temperature or low temperature firable glass sealing. This technique utilizes low melting glass, also referred to in the art as glass solder, and therefore provides various advantages including a viscosity of the glass which decreases with an increase of temperature. The viscous flow of the glass has the advantage of compensating and planarizing surface irregularities and glass solder is therefore convenient for bonding surfaces with a high roughness due to plasma etching or deposition. A low viscosity promotes hermetically sealed encapsulation of structures based on a better adaption of the structured shapes. A particularly preferred glass solder has a melting point of 220-300° C. The low-melting glass can be used with metals, ceramics and resins, as well as melted with a variety of heat sources such as hot plates, infra-red lamps, lasers, etc. A suitable low melting glass is available from Hitachi Chemicals as an environmentally-compatible low-melting vanadate glass referred to as Vaneetect.

Hermeticity, or a hermetic seal, is defined herein as having a leak rate of no more than $1 \times 10^{-3}$ atm·cm$^3$/second, more preferably no more than $5 \times 10^{-3}$ atm·cm$^3$/second of helium, even more preferably no more than $5 \times 10^{-7}$ atm·cm$^3$/second of helium and most preferably no more than $1 \times 10^{-8}$ atm·cm$^3$/second of helium.

The invention has been described with particular emphasis on the preferred embodiments. One of skill in the art would realize additional embodiments, alterations, and advances which, though not enumerated, are within the invention as set forth more specifically in the claims appended hereto

The invention claimed is:

1. A method of forming a capacitor comprising: forming an anode with an anode lead extending therefrom;
   forming a dielectric on said anode;
   forming a solid cathode layer on said dielectric; and
   forming a hermetic encasement on said capacitor wherein said hermetic encasement comprises a conformal non-conductive layer, wherein said conformal non-conductive layer is a ceramic coating.

2. The method of forming a capacitor of claim 1 wherein said hermetic encasement further comprises a conformal metal coating hermetically sealed to said conformal non-conductive layer.

3. The method of forming a capacitor of claim 2 wherein said conformal metal coating is formed by a method selected from the group consisting of electroplating, electroless plating, sputtering and atomic layer deposition.

4. The method of forming a capacitor of claim 2 wherein said conformal metal coating comprises at least 50% of a surface area of said hermetic encasement.

5. The method of forming a capacitor of claim 1 wherein said solid cathode layer comprises at least one of a conductive polymer layer, a carbon containing layer and a metal containing layer.

6. The method of forming a capacitor of claim 1 further comprising an anode termination electrically connected to said anode wire.

7. The method of forming a capacitor of claim 6 wherein said conforming non-conductive layer is on said anode termination or said anode wire.

8. The method of forming a capacitor of claim 1 further comprising electrically connecting a cathode termination to said solid cathode layer.

9. The method of forming a capacitor of claim 8 wherein said cathode termination is electrically connected to a conformal metal coating hermetically sealed to said conformal non-conductive layer.

10. The method of forming a capacitor of claim 1 wherein said conformal non-conductive layer is on said dielectric.

11. The method of forming a capacitor of claim 1 wherein said conformal non-conductive hermetic layer is on said anode wire.

12. The method of forming a capacitor of claim 1 wherein said hermetic encasement has a leak rate no more than $1 \times 10^{-3}$ atm·cm$^3$/second.

13. The method of forming a capacitor of claim 12 wherein said hermetic encasement has a leak rate no more than $1 \times 10^{-8}$ atm·cm$^3$/second of helium.

14. The method of forming a capacitor of claim 1 wherein said conformal non-conductive layer is formed by a method selected from the group consisting of coating by flame spray, coating by atomic layer deposition and formation of a low temperature fired glass coating.

15. The method of forming a capacitor of claim 1 further comprising a non-conductive resin encasing a portion of said capacitor.

16. The method of forming a capacitor of claim 15 wherein said conforming non-conducting layer is on said non-conductive resin.

17. The method of forming a capacitor of claim 1, further comprising co-sintered said ceramic coating with said anode.

18. The method of forming a capacitor of claim 1, wherein said anode wire extends through said ceramic coating.

19. The method of forming a capacitor of claim 18 wherein said anode wire is hermetically sealed to said ceramic coating.

20. The method of forming a capacitor of claim 1 wherein said forming of said dielectric is prior to said forming of said conformal non-conductive layer.

* * * * *